United States Patent
Fang et al.

(10) Patent No.: US 9,813,286 B2
(45) Date of Patent: Nov. 7, 2017

(54) METHOD FOR VIRTUAL LOCAL AREA NETWORK FAIL-OVER MANAGEMENT, SYSTEM THEREFOR AND APPARATUS THEREWITH

(71) Applicant: Industrial Technology Research Institute, Hsinchu (TW)

(72) Inventors: Hsiang-Ting Fang, Keelung (TW); Yu-Wei Lee, Changhua County (TW); Tzi-Cker Chiueh, Taipei (TW); Chih-Yu Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 192 days.

(21) Appl. No.: 14/981,937

(22) Filed: Dec. 29, 2015

(65) Prior Publication Data

US 2017/0155542 A1 Jun. 1, 2017

(30) Foreign Application Priority Data

Nov. 26, 2015 (TW) .............................. 104139384 A
Dec. 7, 2015 (CN) .......................... 2015 1 0893403

(51) Int. Cl.
*H04L 12/24* (2006.01)
*H04L 12/46* (2006.01)

(52) U.S. Cl.
CPC ...... *H04L 41/0654* (2013.01); *H04L 12/4641* (2013.01)

(58) Field of Classification Search
CPC ......... H04L 45/28; H04L 12/24; H04L 12/46; H04L 41/0654; H04L 12/4641
See application file for complete search history.

(56) References Cited

U.S. PATENT DOCUMENTS 8,605,734 B2    12/2013   Ichino
8,811,212 B2    8/2014    Beheshti-Zavareh et al.
(Continued)

FOREIGN PATENT DOCUMENTS

CN    103346904    10/2013
CN    103782552    5/2014
(Continued)

OTHER PUBLICATIONS

"Office Action of Taiwan Counterpart Application," dated Jan. 19, 2017, p. 1-p. 4.
(Continued)

*Primary Examiner* — Andrew Lee
(74) *Attorney, Agent, or Firm* — JCIPRNET

(57) ABSTRACT

A method for virtual local area network fail-over management, a system therefor and an apparatus therewith are introduced herein. In the method for virtual local area network fail-over management in a hybrid software-defined network (SDN), a controller with a centralized management authority may manage some fail-over events that occur in each link or switch in a centralized manner. The controller may pre-calculate backup paths for each link or switch in case that fail-over events occur therefrom. Whenever the fail-over event occurs in some specific link or switch, the controller may deploy the pre-calculated backup path in response to the link down or switch down event, which may reduce the convergence recovery time for the VLAN path in case of fail-over events and improve the reliability of data transmission.

32 Claims, 13 Drawing Sheets

(56) References Cited

U.S. PATENT DOCUMENTS

| | | | |
|---|---|---|---|
| 8,953,441 | B2 | 2/2015 | Nakil et al. |
| 9,042,234 | B1 | 5/2015 | Liljenstolpe et al. |
| 2005/0015685 | A1 | 1/2005 | Yamamoto |
| 2005/0276217 | A1 | 12/2005 | Gadgil et al. |
| 2009/0249115 | A1 | 10/2009 | Bycroft et al. |
| 2010/0254257 | A1* | 10/2010 | Wu .......... H04L 12/42 370/222 |
| 2013/0028073 | A1 | 1/2013 | Tatipamula et al. |
| 2013/0108259 | A1* | 5/2013 | Srinivas ........ H04Q 3/0083 398/25 |
| 2013/0223440 | A1 | 8/2013 | DeCusatis et al. |
| 2013/0266007 | A1 | 10/2013 | Kumbhare et al. |
| 2013/0315580 | A1 | 11/2013 | Boertjes et al. |
| 2014/0269415 | A1 | 9/2014 | Banavalikar et al. |
| 2014/0325649 | A1 | 10/2014 | Zhang |
| 2015/0006757 | A1* | 1/2015 | Boutros .......... H04L 45/14 709/242 |
| 2015/0043382 | A1* | 2/2015 | Arora .......... H04L 41/0803 370/254 |
| 2015/0043383 | A1 | 2/2015 | Farkas et al. |
| 2015/0326426 | A1 | 11/2015 | Luo et al. |
| 2016/0036813 | A1* | 2/2016 | Wakumoto ........ H04L 63/0272 713/171 |
| 2016/0043894 | A1* | 2/2016 | Chennamsetty ...... H04L 49/354 370/221 |
| 2016/0057054 | A1* | 2/2016 | Lumezanu .......... H04L 45/48 370/256 |
| 2016/0087845 | A1* | 3/2016 | Kaneriya .......... H04L 49/351 370/254 |
| 2016/0142285 | A1* | 5/2016 | Lee .......... H04L 69/22 370/392 |
| 2016/0197824 | A1* | 7/2016 | Lin .......... H04L 45/38 370/389 |
| 2017/0006067 | A1* | 1/2017 | Narain .......... H04L 41/0823 |
| 2017/0054604 | A1* | 2/2017 | Wakumoto .......... H04L 12/462 |
| 2017/0118066 | A1* | 4/2017 | Mathew .......... H04L 41/0663 |

FOREIGN PATENT DOCUMENTS

| | | |
|---|---|---|
| WO | 2014131429 | 9/2014 |
| WO | 2015152436 | 10/2015 |

OTHER PUBLICATIONS

Van Adrichem et al., "Fast Recovery in Software-Defined Networks", 2014 Third European Workshop on Software Defined Networks (EWSDN), Sep. 1-3, 2014, pp. 61-66.

Sharma et al., "Enabling fast failure recovery in OpenFlow networks", 2011 8th International Workshop on the Design of Reliable Communication Networks (DRCN), Oct. 10-12, 2011, pp. 164-171.

Beheshti et al., "Fast Failover for Control Traffic in Software defined Networks", 2012 IEEE Global Communications Conference (GLOBECOM), Dec. 3-7, 2012, pp. 2665-2670.

Nakagawa et al., "Domain Flow: practical flow management method using multiple flow tables in commodity switches", CoNEXT '13 Proceedings of the ninth ACM conference on Emerging networking experiments and technologies, Dec. 9-12, 2013, pp. 399-404.

Borokhovich et al., "Provable data plane connectivity with local fast failover: introducing openflow graph algorithms", HotSDN '14 Proceedings of the third workshop on Hot topics in software defined networking, COMM ACM SIGCOMM, Aug. 22, 2014, pp. 121-126.

Kuzniar et al., "Automatic Failure Recovery for Software-Defined Networks", HotSDN '13 Proceedings of the second ACM SIGCOMM workshop on Hot topics in software defined networking, COMM ACM SIGCOMM, Aug. 16, 2013, pp. 159-160.

Kempf et al., "Scalable fault management for OpenFlow", 2012 IEEE International Conference on Communications (ICC), Jun. 10-15, 2012, pp. 6606-6610.

Padma et al., "Proactive Failure Recovery in OpenFlow Based Software Defined Networks", 2015 3rd International Conference on Signal Processing, Communication and Networking (ICSCN), Mar. 26-28, 2015, pp. 1-6.

Fressancourt "A SDN-based network architecture for cloud resiliency", 2015 12th Annual IEEE Consumer Communications and Networking Conference (CCNC), Jan. 9-12, 2015, pp. 479-484.

* cited by examiner link failure backup path table during operation  410

| link 332 failure | switch 310, port 2 → switch 312, port 2 |
| | switch 312, port 1 → switch 316, port 1 |
| | switch 316, port 2 → switch 314, port 2 |
| | switch 314, port 3 → switch 318, port 1 |
| | switch 318, port 2 → switch 320, port 2 |
| ... | ... |

FIG. 4B switch failure backup path table during operation  420

| switch 318 failure | switch 310, port 1 → switch 314, port 1 |
| | switch 314, port 2 → switch 316, port 2 |
| | switch 316, port 3 → switch 320, port 1 |
| ... | ... |

FIG. 4C link failure backup path table during deployment  ╱─510

| link 332 failure | switch 310, port 1 → remove Vlan10 |
| | switch 314, port 1 → remove Vlan10 |
| | switch 310, port 2 → add Vlan10 |
| | switch 312, port 2 → add Vlan10 |
| | switch 312, port 1 → add Vlan10 |
| | switch 316, port 1 → add Vlan10 |
| ... | ... |

FIG. 5A switch failure backup path table during deployment  ╱─520

| switch 318 failure | switch 314, port 3 → remove Vlan10 |
| | switch 320, port 2 → remove Vlan10 |
| | switch 316, port 3 → add Vlan10 |
| | switch 320, port 1 → add Vlan10 |
| ... | ... |

FIG. 5B

METHOD FOR VIRTUAL LOCAL AREA NETWORK FAIL-OVER MANAGEMENT, SYSTEM THEREFOR AND APPARATUS THEREWITH

CROSS-REFERENCE TO RELATED APPLICATION

This application claims the priority benefits of Taiwan application serial no. 104139384, filed on Nov. 26, 2015 and Chinese application serial no. 201510893403.8, filed on Dec. 7, 2015. The entirety of each of the above-mentioned patent applications is hereby incorporated by reference herein and made a part of this specification.

BACKGROUND

Technical Field

The disclosure relates to a method for virtual local area network (VLAN) recovery in a hybrid software-defined network (SDN), a system therefor, and a controller therewith.

Description of Related Art

A traditional network relies on distributed communication protocol calculation for setting VLAN paths (virtual local area network paths), which for example utilizes STP (spanning tree protocol) or VTP (VLAN trunking protocol). Thus, when a failure event occurs in some links or switches, the switches need to exchange information so as to recalculate the paths. For this reason, whenever link failure occurs, it will take several seconds for convergence, which is a concern to data centers that require high reliability.

SUMMARY

Exemplary embodiments of the disclosure provide a method for virtual local area network (VLAN) recovery, which is suitable for a network in a hybrid SDN configuration. The network at least includes a controller and a plurality of switches. In the method, a backup path table is pre-calculated based on the network, and an event notification message is generated according to a connection failure of the VLAN. A link failure process is enabled according to the backup path table in response to the event notification message and a checking process is performed simultaneously. If a result of the checking process indicates that the connection failure is a switch failure event, a setting changed by the link failure process is recovered and a switch failure process is performed to re-establish the VLAN according to a first path corresponding to the connection failure of the VLAN in the backup path table. If the result of the checking process indicates that the connection failure is not the switch failure event, the link failure process re-establishes the VLAN according to a second path corresponding to the connection failure of the VLAN in the backup path table.

Exemplary embodiments of the disclosure provide a controller for performing a VLAN recovery function in a network of a hybrid SDN configuration. The controller includes a processor and a memory. The memory is for storing a backup path table, and the processor is configured to receive an event notification message. The processor is configured to enable a link failure process according to the backup path table and re-establish the VLAN according to a first path in the backup path table in response to a connection failure of the VLAN. The processor is configured to perform a checking process in response to the connection failure of the VLAN, in which if a result of the checking process indicates that the connection failure is a switch failure event, the processor recovers a setting changed by the link failure process and performs a switch failure process to re-establish the VLAN according to a second path corresponding to the connection failure of the VLAN in the backup path table. If the result of the checking process indicates that the connection failure is not the switch failure event, the processor stops performing the checking process.

Exemplary embodiments of the disclosure provide a system with a VLAN recovery function, which is suitable for a network of a hybrid SDN configuration. The system at least includes a controller and a plurality of switches. The switch is for generating an event notification message according to a connection failure of the VLAN. The controller simultaneously performs a link failure process and a checking process when receiving the event notification message, in which the controller performs the link failure process, which includes re-establishing the VLAN on the switches on the corresponding path according to a first path corresponding to the connection failure of the VLAN in a backup path table. When the controller performs the checking process, if a result of the checking process indicates that the connection failure is a switch failure event, a setting changed by the link failure process is recovered and a switch failure process is performed to re-establish the VLAN on the switches on the corresponding path according to a second path corresponding to the connection failure of the VLAN in the backup path table, and if the result of the checking process indicates that the connection failure is not the switch failure event, the checking process is stopped.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4B and FIG. 4C respectively illustrate the backup paths the controller pre-calculates for failure events of all the links and switches.

FIG. 5A is a schematic diagram illustrating a link failure event backup path table at the time of deployment, for example, which needs to be completed when re-deployment is performed using the link failure event backup path table according to one of the exemplary embodiments of the disclosure.

FIG. 5B is a schematic diagram illustrating a switch failure backup path table at the time of deployment, for example, which needs to be completed when re-deployment is performed using the switch failure backup path table according to one of the exemplary embodiments of the disclosure.

DESCRIPTION OF THE EMBODIMENTS

Figure 1A:
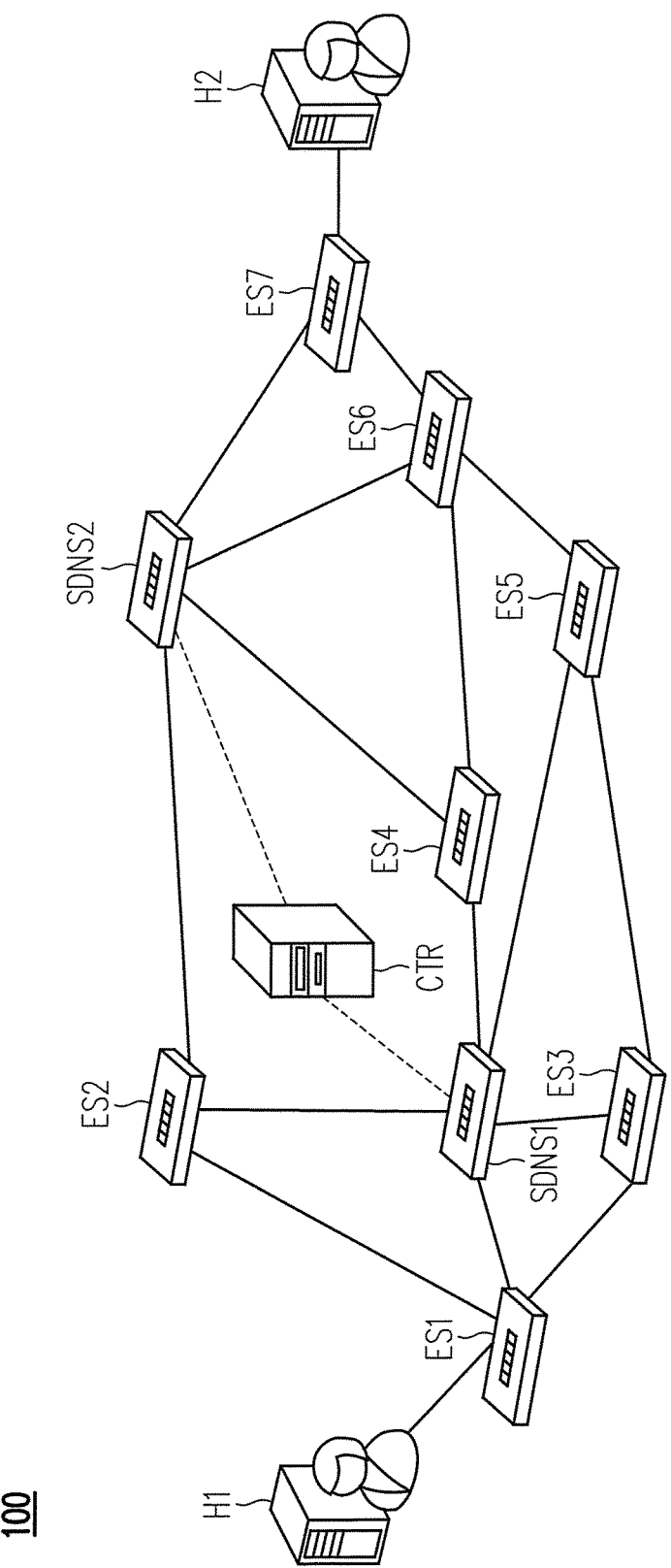
FIG. 1A is a schematic diagram illustrating a hybrid SDN configuration according to one of the exemplary embodiments of the disclosure.

At least one of the exemplary embodiments of the disclosure provides a technique of using a SDN (software-defined network), which is applied to a virtual local area network (VLAN) recovery mechanism of a hybrid SDN configuration. In at least one exemplary embodiment, the VLAN recovery mechanism manages events of the links or switches in a centralized manner based on the characteristics of SDN centralized management, in which when a controller of centralized management calculates each VLAN path, the controller pre-calculates backup paths for failure events of all links and switches and stores the same therein. When a failure event occurs in the links or switches, the controller may deploy a corresponding backup path by receipt of the failure event so as to eliminate the convergence time required for repairing the VLAN path, and thereby improve the reliability of data transmission and achieve a quick recovery mechanism in the hybrid SDN configuration.

In this disclosure, "SDN" refers to a type of network. This configuration changes a control mode of the traditional network configuration and divides the network into a control plane and a data plane and gives the management authority of the network to the controller software in the control plane so as to perform centralized control and management. The controller (which may be a server or any device having such a function) coupled to the SDN provides a definition of transmission information to the corresponding switches in the SDN. The definition may include a priority value, a rule specifying information flow, and an operation for data flow transmission (e.g. forward or "discard"). The rule may specify information, such as input port, VLAN tag, MAC (media access control) address and destination address, Ethernet type, IP (Internet protocol) source address and destination address, IP (Internet protocol), TCP (transmission control protocol) source port and destination port, and so on. The fields of other packet headers in the transmission information may also be included in the rule, depending on their characteristics. After being matched to at least one rule, the switch in the SDN adopts the operation included in the corresponding information flow definition. An example of the SDN includes, but not limited to, the OpenFlow protocol described in the "OpenFlow Switch Specification" specified by the Open Networking Foundation (ONF), for example.

In some exemplary embodiments, the SDN constructed by the hybrid SDN may include a plurality of Ethernet switches and at least one SDN switch. In the Ethernet switch, a random number of switches coupled by any topology may be logically operated as one single switch. OpenFlow is the most popular technology for implementing SDN. OpenFlow protocol (OFP) is a communication protocol used between the network controller and the OpenFlow switches. In this disclosure, the SDN switch and SDN controller can be realized using commodity OpenFlow switch as well as an OpenFlow controller. The Ethernet switches are widely used due to the advantages of high speed, low cost and plug-and-play function.

In at least one exemplary embodiment of the disclosure, in the provided hybrid SDN configuration including the VLAN recovery mechanism, the controller (which may be a server or any device having this function) may control the Ethernet switch through SNMP (simple network management protocol) or a CLI (command-line interface) instruction and use an OpenFlow module to control the SDN switch. The controller under the hybrid SDN configuration has path repair for simultaneously processing link or switch failure events.

The SNMP provided in this disclosure refers to a protocol for a network management system. The network management system includes a network management station and a network element. The network management station may be a server or a computer that has information processing capacity and executes a SNMP manager to monitor and control the network element under management. The network element is hardware equipment, such as a host, a bridge, a router, a terminal, a server, and so on, and includes a SNMP agent for executing a command given by the network management station, in which SNMP is a communication protocol for exchanging network management messages between the SNMP manager and the SNMP agent.

Under some special circumstances, the SNMP agent may automatically issue an event report, by a SNMP Trap for example, to notify the SNMP manager of occurrence of some situations. The CLI provided in this disclosure is a general interface for directly giving a command by text between communication devices.

A VLAN recovery mechanism in the hybrid SDN configuration of the disclosure is described below as an example. Nevertheless, it should be noted that the disclosure is not limited thereto.

Figure 1B:
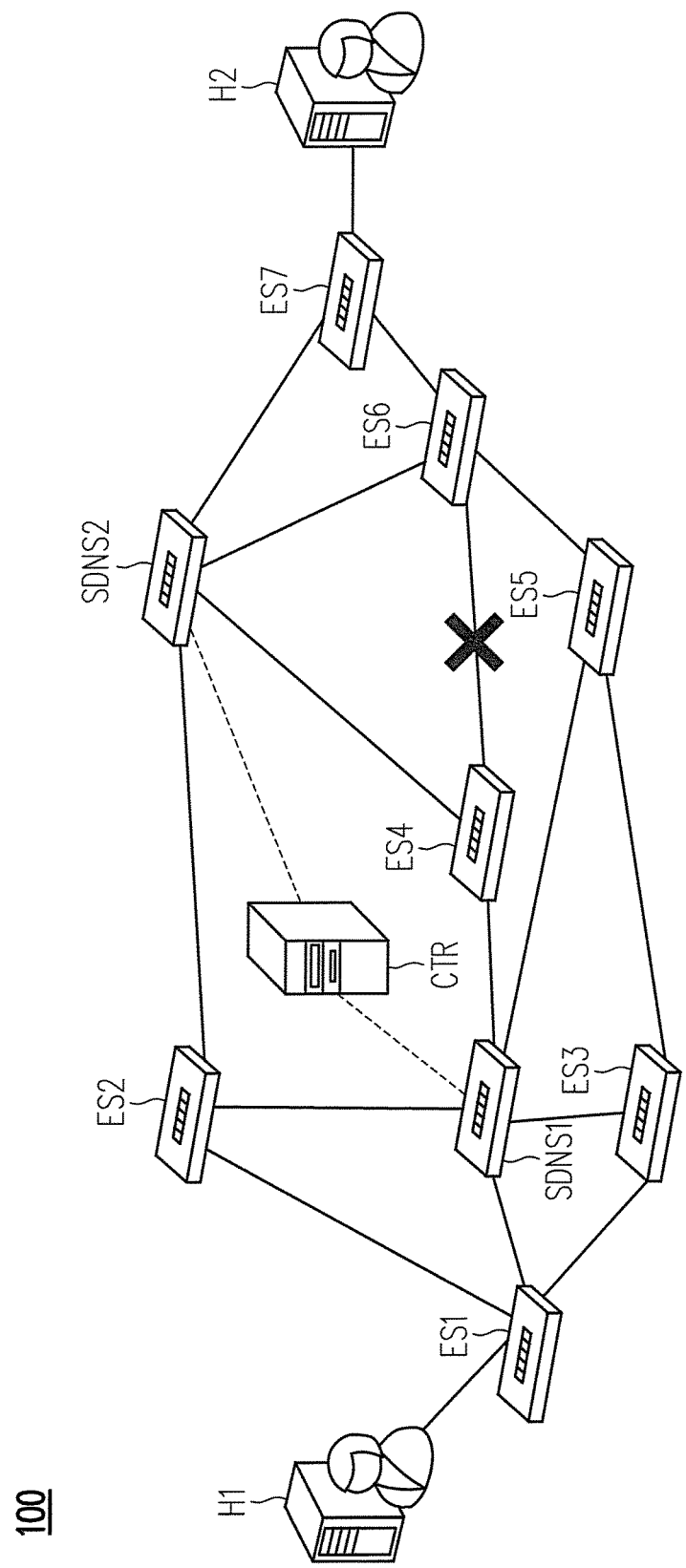
FIG. 1B illustrates a method of notifying a link failure event in the recovery mechanism according to an exemplary embodiment of the disclosure.
Figure 1C:
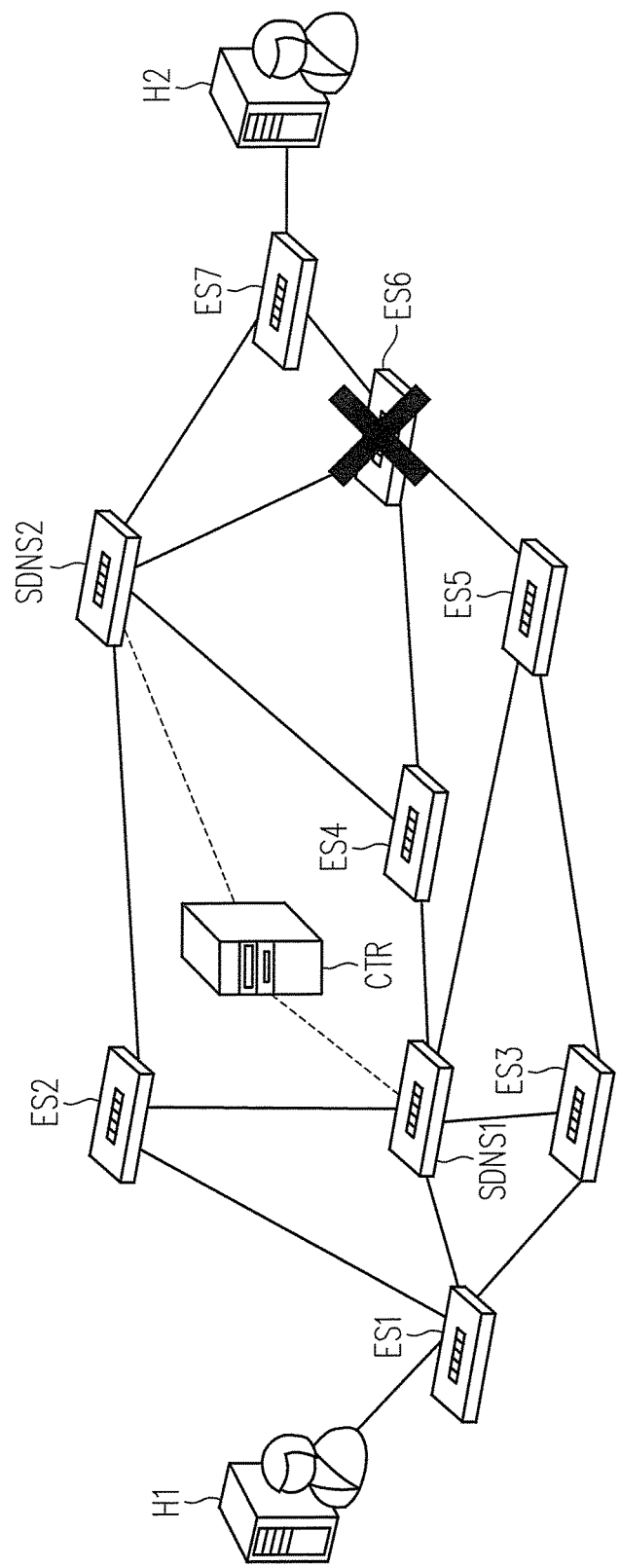
FIG. 1C illustrates a method of notifying a switch failure event in the recovery mechanism according to an exemplary embodiment of the disclosure.
Figure 1D:
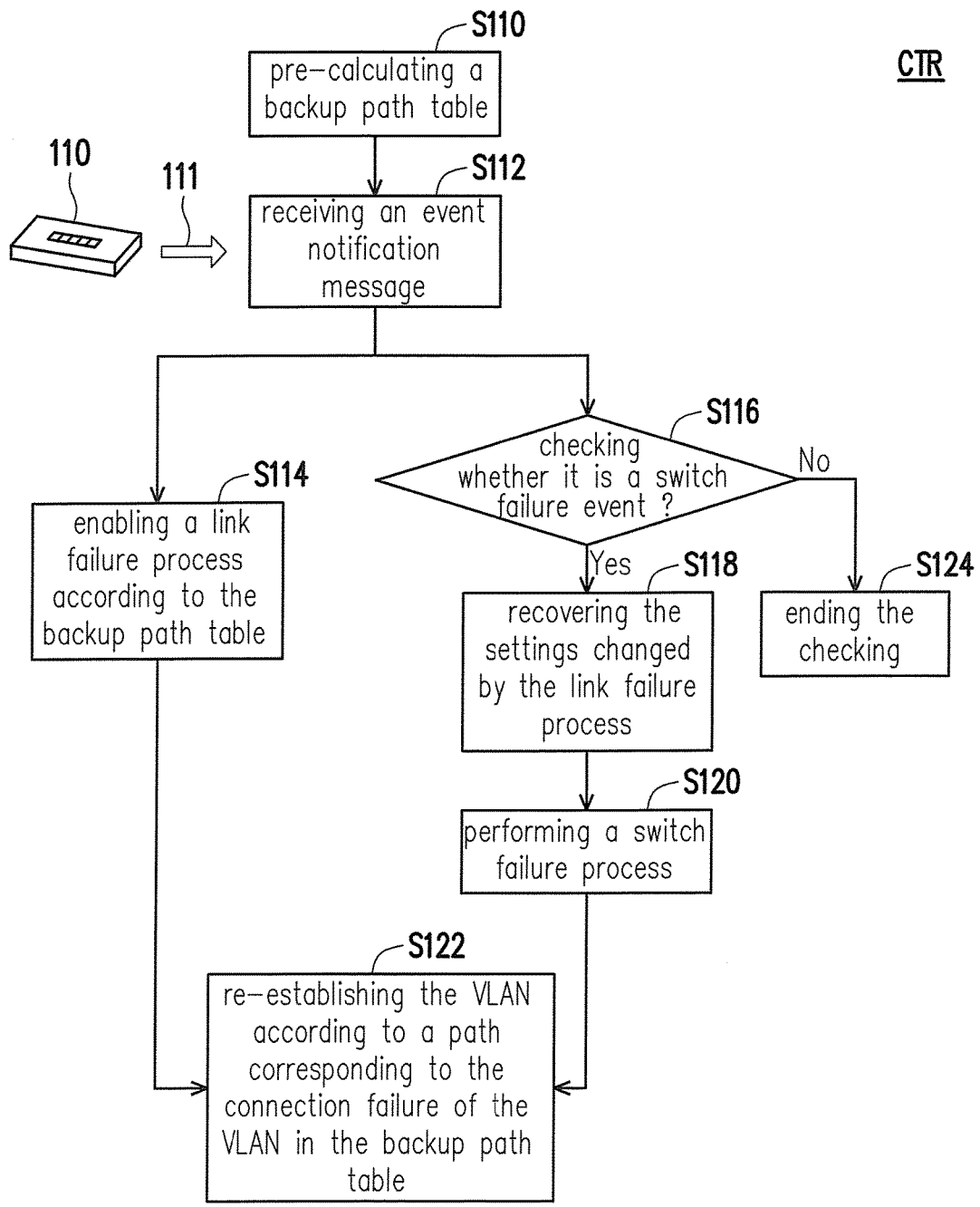
FIG. 1D is a flowchart illustrating a method for VLAN recovery in the hybrid SDN configuration according to one of the exemplary embodiments of the disclosure.

Referring to FIG. 1A to FIG. 1D, FIG. 1A is a schematic diagram illustrating a hybrid SDN configuration according to one of the exemplary embodiments of the disclosure; FIG. 1B illustrates a method of notifying a link failure event in the recovery mechanism according to an exemplary embodiment of the disclosure; FIG. 1C illustrates a method of notifying a switch failure event in the recovery mechanism according to an exemplary embodiment of the disclosure; and FIG. 1D is a flowchart illustrating a method for VLAN recovery in the hybrid SDN configuration according to one of the exemplary embodiments of the disclosure.

A network 100 under the hybrid SDN configuration includes a controller CTR, a first server H1 and a second server H2, a plurality of Ethernet switches, and a plurality of SDN switches, such as a first switch ES1, a second switch ES2, a third switch ES3, a fourth switch ES4, a fifth switch ES5, a sixth switch ES6, and a seventh switch ES7 of the Ethernet switches as shown, and a first SDN switch SDNS1 and a second SDN switch SDNS2. To facilitate the description, in this exemplary embodiment, the hybrid SDN is described based on one controller, two servers, seven Ethernet switches, and two SDN switches. Nevertheless, the disclosure should not be construed as limited thereto.

In another exemplary embodiment, the network 100 may include more servers and switches.

In this exemplary embodiment, the network 100 is formed by connecting the controller CTR, the first and second servers H1 and H2, the first to seventh switches ES1-ES7, and the first and second SDN switches SDNS1-SDNS2 with one another.

The network 100 is a layer two network, for example. Here, the controller CTR, the first and second servers H1 and H2, the first to seventh switches ES1-ES7, and the first and second SDN switches SDNS1-SDNS2 may also be deemed as nodes in the network 100.

The controller CTR is for managing all the physical machines, virtual machines, and switches connected in the network 100. For example, the controller CTR is a server and stores the related management information, in which the management information includes information related to the virtual machines operating in the physical machines and information related to the switches connected to the physical machines. In at least one exemplary embodiment of the disclosure, the controller CTR may control the Ethernet switches through SNMP or a CLI instruction, and the controller CTR may control the first to seventh switches ES1-ES7 which belong to Ethernet switches. The controller CTR may use an OpenFlow module to control the SDN switches, e.g. the first and second SDN switches SDNS1-SDNS2.

The first and second servers H1 and H2 in the network 100 or other servers that are not shown but constructed under the network 100 all belong to a physical host. The first and second servers H1 and H2 or other servers may respectively operate one or a plurality of virtual machines, so as to provide different services. For example, the first and second servers H1 and H2 may be provided with a virtual bridge, which is capable of enabling/disabling the STP function, configuring STP-related options, setting firewall rules, and populating a forwarding table.

The first to seventh switches ES1-ES7 and the first and second SDN switches SDNS1-SDNS2 or other switches that are not shown but constructed under the network 100 are deployed among the controller CTR, the first and second servers H1 and H2, and other servers that are not shown but constructed under the network 100 for forwarding at least a data packet. For example, the first to seventh switches ES1-ES7 and the first and second SDN switches SDNS1-SDNS2 are layer two switches and are capable of enabling/disabling the STP function, configuring STP-related options, allowing/blocking broadcast, multicast, and unknown unicast data packets, populating the forwarding table, and performing remote setting through CLI or SNMP interface.

In this exemplary embodiment, the controller CTR or another router element is disposed for calculating routing paths of the network 100 (which are also called "predetermined routing paths" here). For example, the predetermined routing path is calculated according to a routing algorithm, so as to utilize all the bandwidths of the network 100 more efficiently. The routing path obtained through the calculation is transmitted to each switch by the controller CTR. For example, for the Ethernet switches, the Ethernet switches may be set through SNMP communication protocol. For the SDN switches, the switches may be set through the OpenFlow communication protocol, for example. The controller CTR may adopt Dijkstra's algorithm, for example, to calculate the shortest or best path from a certain node, serving as the start node, to all the other nodes. Nevertheless, the disclosure is not limited thereto.

In the recovery mechanism according to several exemplary embodiments, in addition to calculating the routing paths, the controller CTR may also pre-calculate backup paths for the failure events of all the links and switches and store the same in the controller CTR. When a failure event occurs in the links or switches, the controller CTR may deploy the corresponding backup path by receipt of the failure event, so as to eliminate a convergence time required for repairing the VLAN path and improve the reliability of data transmission.

Referring to FIG. 1B, FIG. 1B illustrates a method of notifying a link failure event in the recovery mechanism according to this exemplary embodiment of the disclosure. In this exemplary embodiment, for example, when a link failure event occurs between the fourth switch ES4 and the sixth switch ES6 which belong to Ethernet switches, the fourth switch ES4 and the sixth switch ES6 issue a link down notification message to notify the controller CTR. In an exemplary embodiment, the controller CTR may be notified by a SNMP Trap, for example. The controller CTR may quickly adopt the pre-calculated backup path to quickly repair transmission of the network 100.

Referring to FIG. 1C, FIG. 1C illustrates a method of notifying a switch failure event in the recovery mechanism according to this exemplary embodiment of the disclosure. In this exemplary embodiment, a failure event of the sixth switch ES6 may result from damage or overload of the sixth switch ES6, which makes the sixth switch ES6 unable to transmit the packet. Consequently, the link established between the fourth switch ES4 and the sixth switch ES6, the link established between the seventh switch ES7 and the sixth switch ES6, the link established between the second SDN switch SDNS2 and the sixth switch ES6, and the link established between the seventh switch ES and the sixth switch ES6 are down. Thus, the fourth switch ES4, the fifth switch ES5, the seventh switch ES7, and the second SDN switch SDNS2 issue the link down notification message to notify the controller CTR. In an exemplary embodiment, the controller CTR may be notified by a SNMP abnormal condition notification signal SNMP Trap from the fourth switch ES4, the fifth switch ES5, the seventh switch ES7 or a link failure notification message from the second SDN switch SDNS2. Then, according to the SNMP Trap notifications of the fourth switch ES4, the fifth switch ES5, and the seventh switch ES7 or the link failure notification message from the second SDN switch SDNS2, the controller CTR determines that it may be a switch failure event and quickly adopts the pre-calculated backup path to quickly repair the transmission of the network 100.

In an exemplary embodiment, the controller CTR may determine whether the link with the sixth switch ES6 is down by protocols that have established communication between the controller CTR and the sixth switch ES6, so as to determine whether the switch failure event belongs to the sixth switch ES6, in which the protocols may include ICMP (Internet control management protocol), OpenFlow protocol, Telnet communication protocol, SSH (secure shell) remote login protocol application, SNMP, ARP (address resolution protocol), and so on, for example. ICMP is adopted in this exemplary embodiment.

In terms of processing an error event, the method for VLAN recovery in the hybrid SDN configuration provided in this exemplary embodiment of the disclosure may be divided into two aspects, i.e. Ethernet switch aspect and SDN switch aspect. Regarding the Ethernet switches, if the SNMP abnormal condition notification signal SNMP Trap is set in advance in the Ethernet switches, the Ethernet switches may use SNMP Trap to notify the controller when a link failure event occurs. When a Ethernet switch failure event occurs, since the Ethernet switch itself cannot send any notification to the controller, it depends on the neighbors around the Ethernet switch to notify the controller of the link failure, such that the controller may determine whether the Ethernet switch is still alive, for example, by determining whether there is a response directly by ICMP.

If the aforementioned link failure event or switch failure event occurs in the SDN switch, e.g. the first and second SDN switches SDNS1-SDNS2 shown in the figure, the SDN switch may use the OpenFlow module, for example, to issue the link down notification message to notify the controller. When a link failure event occurs, the SDN switch may use a link failure notification message, for example, to notify the controller. For the SDN switch failure event, the controller and the SDN switch regularly exchange information to confirm normal operation of the SDN switch, i.e. keep alive information. When a SDN switch failure event is found, that is, the keep alive confirmation information cannot be obtained, the controller automatically determines that the SDN switch fails. The method for VLAN recovery of this exemplary embodiment of the disclosure is described hereinafter based on a practical example.

FIG. 1D is a flowchart illustrating the method for VLAN recovery in the hybrid SDN configuration according to one of the exemplary embodiments of the disclosure.

The method for VLAN recovery of this exemplary embodiment is suitable for the network 100 of the hybrid SDN configuration as shown in FIG. 1A, for example. The network 100 includes the controller CTR and a switch 110. The switch 110 may be one of the Ethernet switches ES1-ES7 or one of the SDN switches SDNS1-SDNS2, as shown in FIG. 1A, or any switch in the network 100, for example. According to the method for VLAN recovery of this exemplary embodiment, first, in Step S110, the controller CTR pre-calculates a backup path table based on the network. The switch 110 generates an event notification message 111 according to a connection failure of the VLAN and transmits the event notification message 111 to the controller CTR. After receiving the event notification message 111 (as shown in Step S112), the controller CTR enables a link failure process according to the pre-calculated backup path table in response to the event notification message 111, as shown in Step S114, and at the same time performs a checking process, as shown in Step S116, to check whether it is a switch failure event.

If the result of the checking process of Step S116 indicates that it is a switch failure event (Step S116, Yes), the setting changed by the link failure process is recovered as shown in Step S118, and a switch failure process is performed as shown in Step S120, so as to re-establish the VLAN according to a path corresponding to the connection failure of the VLAN in the backup path table as shown in Step S122. In an exemplary embodiment, if the link failure process of Step S114 is not performed yet and the result of the checking process of Step S16 indicates that it is a switch failure event, the link failure process may be stopped, and Step S118, which recovers the setting changed by the link failure process, is not required. If the result of the checking process of Step S116 indicates that it is not the switch failure event described above (Step S16, No), the checking process is stopped, as shown in Step S124.

Figure 2A:
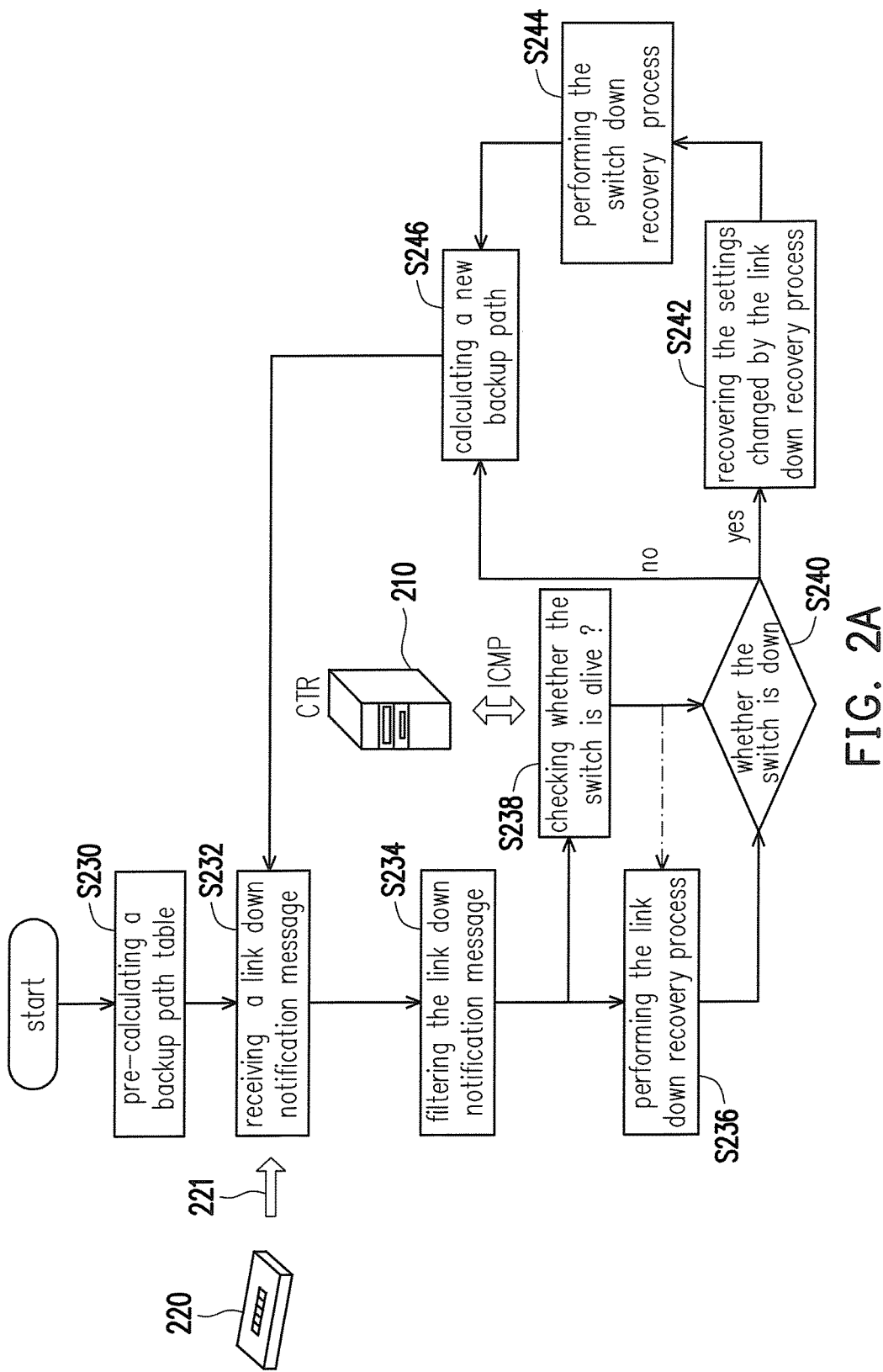
FIG. 2A is a flowchart illustrating a method for virtual local area network recovery in the hybrid SDN configuration according to another exemplary embodiment of the disclosure.

FIG. 2A is a flowchart illustrating a method for VLAN recovery in the hybrid SDN configuration according to an exemplary embodiment of the disclosure. When the hybrid SDN is initially established, a controller 210 calculates the routing paths between the nodes in the network and respectively sets the Ethernet switches or the SDN switches based on the calculated routing paths through SNMP communication protocol and/or OpenFlow communication protocol, for example. In the method for VLAN recovery disclosed in this exemplary embodiment, the controller 210 pre-calculates a backup path table and stores the backup path table (as shown in Step S230). The backup path table may include a link failure backup path table and a switch failure backup path table, for example. The controller 210 continues monitoring whether a link failure event occurs in the network. If a link failure event occurs in a switch 220, the switch 220 sends an event notification message to notify the controller 210. For example, when the link failure event occurs, the switch 220 sends a link down notification message 221 to notify the controller 210. If the link down notification message 221 is sent by an Ethernet switch, the notification may be sent through SNMP Trap, for example. If the link failure event occurs in a SDN switch, the link down notification message 221 may be sent through the OpenFlow module, for example.

The controller 210 that continues monitoring the network is able to determine whether the link failure event occurs. After receiving the link down notification message 221 (as shown in Step S232), the link down notification message 221 is filtered by a filter (as shown in Step S234). The filter may be a software module or a firmware module in the controller 210. One link failure event may be a switch failure event, and if it is a switch failure event, the switches at both ends of the link will both send the link down notification message. Thus, the link down notification message 221 is filtered, so as to prevent repeatedly processing the same link failure event or misjudgment.

Then, a link down recovery process (as shown in Step S236) is performed. For example, a port for transmission of VLAN in the switch is re-deployed. That is, the VLAN transmission port for the switches on the path is re-deployed. To save the time for processing the link failure event, the corresponding backup path is deployed to the network right away when notification of the link failure event is received.

However, the link failure event may result from a switch failure event. Therefore, in addition to the original thread for processing the link failure event, the method further opens a thread to confirm whether the switch is alive at the time of deployment.

In the step of confirming whether the switch is alive (as shown in Step S238), the controller 210 confirms whether the switch is alive. For the Ethernet switch, since the Ethernet switch itself cannot send any notification to the controller 210, it depends on the neighboring switches to notify the controller 210 of the link failure, such that the controller 210 may determine whether the Ethernet switch is alive. For example, the controller 210 issues an ICMP packet to confirm whether the switches at two ends of the link that fails respond to the ICMP packet. The aforementioned ICMP packet may be a packet of other types of protocols for detection, such as OpenFlow protocol, Telnet communication protocol, SSH (secure shell) remote login protocol application, SNMP, ARP (address resolution protocol), and so on. For the SDN switch, the controller 210 regularly exchanges information with the SDN switch to confirm normal operation of the SDN switch, i.e. keep alive information. When a SDN switch failure event is found, that is, the keep alive confirmation information cannot be obtained, the controller 210 automatically determines that the SDN switch fails.

Next, the controller 210 confirms whether the switch is down (as shown in Step S240), so as to confirm whether the switch is alive. If the controller 210 finds that the switch fails (Step S240, yes), the system rolls back the change made to the setting by the link down recovery process. That is, the change made to the setting in the process performed for the link down event (Step S236) is recovered (as shown in Step S242). The reason is that, if it is switch failure, the backup path previously deployed for a link down event will cause an error. Thus, recovery is needed. Then, a switch failure process (as shown in Step S244) is performed. In the case of switch failure, a suitable routing path is retrieved from the pre-calculated switch failure backup path table so as to deploy the backup path to the network. For example, the port for transmission of VLAN in the switch is re-deployed, so as to exclude the damaged switch. That is, the VLAN transmission ports used by other switches on the path are re-deployed. Thereafter, a new backup path is re-calculated (as shown in Step S246).

If the controller 210 confirms that it is a link failure (Step S240, no), the system then re-calculates new backup paths (as shown in Step S246), which include backup paths for link failure and switch failure, and respectively updates the same to the link failure backup path table and the switch failure backup path table.

Figure 2B:
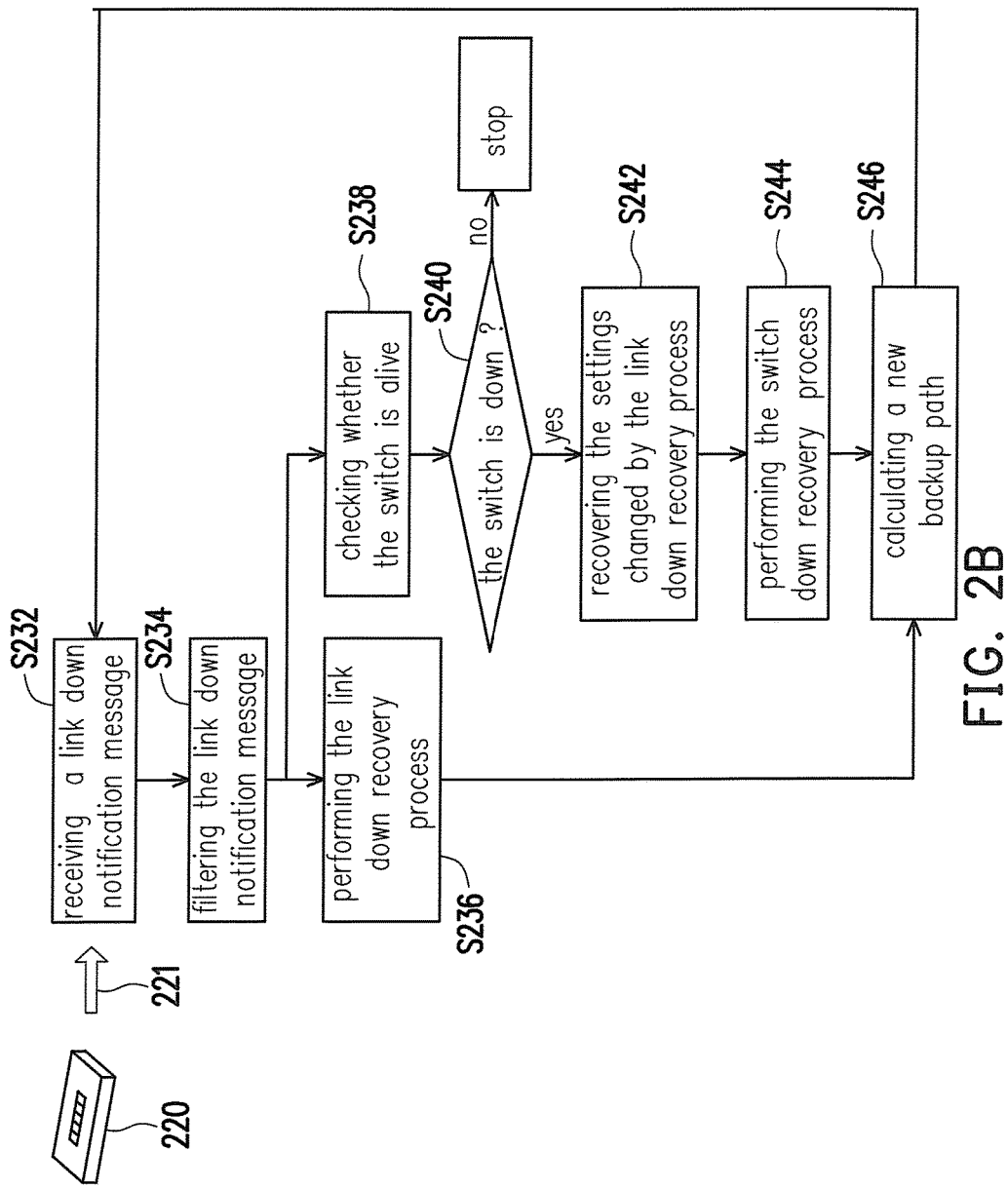
FIG. 2B is a flowchart illustrating a method for virtual local area network recovery in the hybrid SDN configuration according to yet another exemplary embodiment of the disclosure.

FIG. 2B is a flowchart illustrating a method for VLAN recovery in the hybrid SDN configuration according to yet another exemplary embodiment of the disclosure. Basically, the steps of this method that are the same as or similar to the steps of FIG. 2A are assigned with the same reference numerals. Thus, details thereof are not repeated hereinafter. Nevertheless, it should be noted that the steps are performed in a different order. A main difference between this exemplary embodiment and the previous exemplary embodiment is that after the step of confirming whether the switch is alive (as shown in Step S238), if the controller 210 finds that it is a switch failure (Step S240, yes), the system recoveries the change made to the setting by the link down recovery process (as shown in Step S242). Then, the switch down recovery process (as shown in Step S244) is performed. In the case of switch failure, a suitable routing path is retrieved from the pre-calculated switch failure backup path table so as to deploy the backup path to the network. Afterward, a new backup path is re-calculated (as shown in Step S246), and the procedure returns to Step S232 to detect whether the link down notification message 221 is received. In the exemplary embodiment of FIG. 2B, if the link down recovery process (Step S236) is not performed yet and the result of the step of confirming whether the switch is alive (as shown in Step S238) indicates that it is switch failure, the link down recovery process may be stopped (Step S236) and it is not required to recover the change made to the setting by the link down recovery process (Step S242). If the result of the step of confirming whether the switch is alive (as shown in Step S238) indicates that it is not the aforementioned switch failure event (Step S240, no), the checking process is stopped.

Hereinafter, an exemplary embodiment of performing the method for VLAN recovery between the controller and multiple switches in the hybrid SDN configuration of the disclosure is described based on a practical example with reference to FIG. 3A to FIG. 3C. Nevertheless, it should be noted that the disclosure is not limited thereto.

Figure 3A:
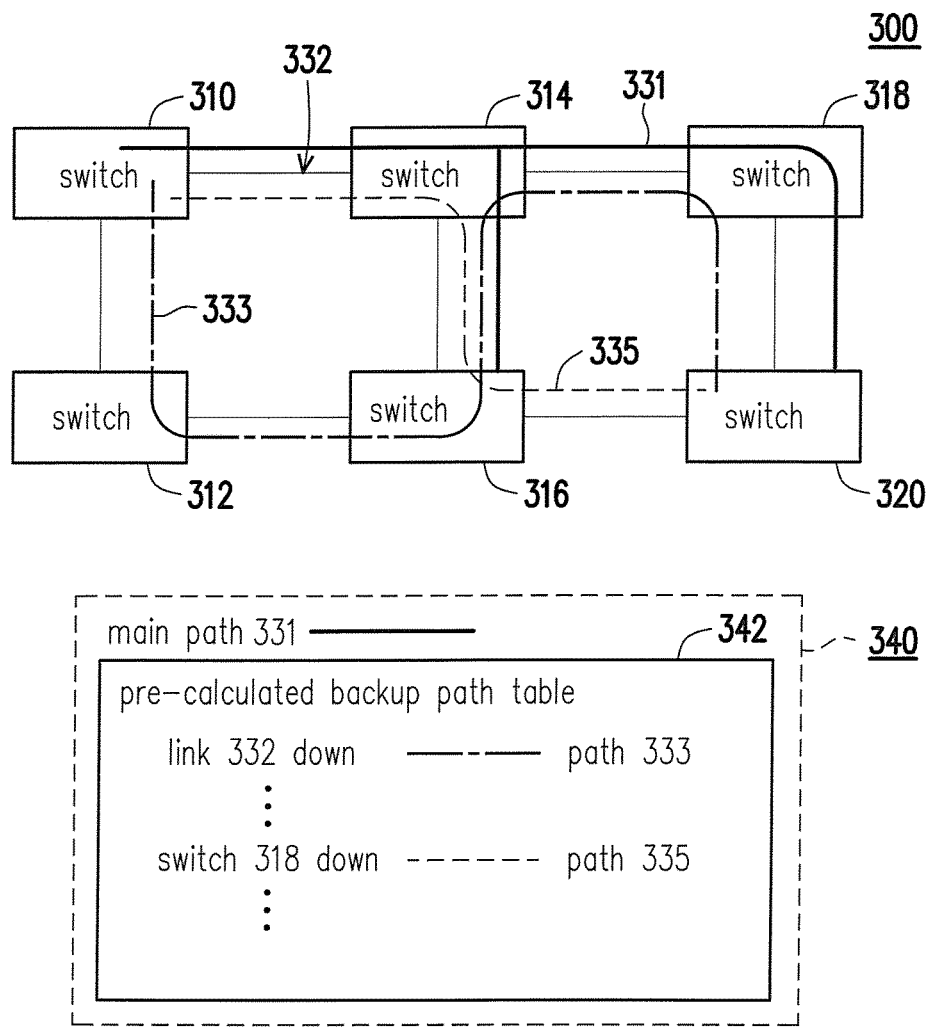
FIG. 3A is a schematic diagram illustrating the VLAN routing that has been deployed between multiple switches under the network configuration according to one of the exemplary embodiments of the disclosure and a pre-calculated backup path table.
Figure 3B:
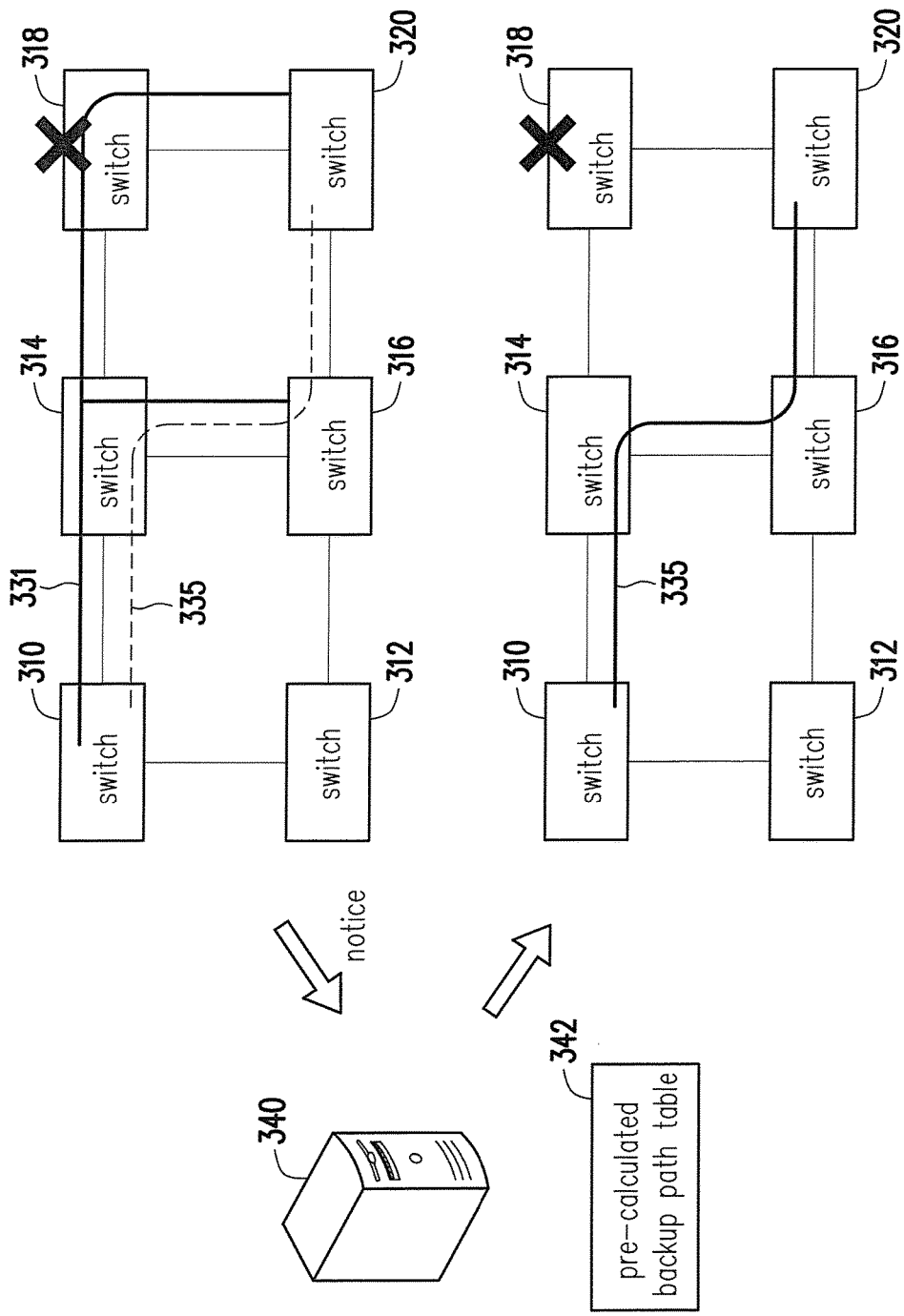
FIG. 3B is a schematic diagram illustrating an error event occurring in the VLAN routing that has been deployed between multiple switches according to one of the exemplary embodiments of the disclosure and an example of switching the routing to the pre-calculated backup path.

Referring to FIG. 3A to FIG. 3C, in this exemplary embodiment, a network 300 constructed under the hybrid SDN configuration at least includes a first switch 310, a second switch 312, a third switch 314, a fourth switch 316, a fifth switch 318, a sixth switch 320, and a controller 340. The controller 340 may control the Ethernet switches through SNMP or a CLI instruction, and control the SDN switches by using an OpenFlow module. In this exemplary embodiment, the controller 340 may control the first switch 310, the second switch 312, the third switch 314, the fourth switch 316, the fifth switch 318, and the sixth switch 320, for example, but not limited thereto.

Referring to FIG. 3A, FIG. 3A is a schematic diagram illustrating the VLAN routing that has been deployed between multiple switches under the configuration of the network 300 according to one of the exemplary embodiments of the disclosure and a pre-calculated backup path table. A main path 331 of VLAN routing is constructed between the first switch 310, the second switch 312, the third switch 314, the fourth switch 316, the fifth switch 318, and the sixth switch 320. The main path 331 of the VLAN at least passes through the first switch 310, the third switch 314, and the fifth switch 318 to the sixth switch 320, and passes through the first switch 310 and the third switch 314 to the fourth switch 316. In this exemplary embodiment of the disclosure, the controller 340 pre-calculates the backup paths for failure events of all the links and switches and stores a pre-calculated backup path table 342 in a storage device or element of the controller 340.

As shown in FIG. 3A, for example, the pre-calculated backup path table 342 includes backup path information related to all link failures and all switch failures. The information may be stored as a link failure backup path table and a switch failure backup path table. In one of the exemplary embodiments as shown in the figure, the backup path table 342 includes a backup path 333 corresponding to failure or damage of a link 332 and a backup path 335 corresponding to failure or damage of the fifth switch 318. It should be noted that this is merely an example and the disclosure is not limited thereto. The backup path table 342 includes the backup path information related to all the link failures and all the switch failures in the network 300 under the hybrid SDN configuration. When a failure event occurs, after re-establishing the topology in the network 300, the controller 340 also re-calculates the backup paths for the failure events of all the links and switches and updates the backup path table 342.

For example, when the link 332 between the first switch 310 and the third switch 314 as shown in the figure fails or is damaged, the controller 340 is notified through the first switch 310 and/or the third switch 314. After confirmation, the controller 340 directly deploys the backup path 333, which passes through the first switch 310, the second switch 312, the fourth switch 316, the third switch 314, and the fifth switch 318 to the sixth switch 320. In the deployment process, the port for transmission of VLAN in the switch is re-deployed. That is, the VLAN transmission port used by the switch on the original main path 331 is re-deployed, so as to switch to the VLAN transmission port planned to be used by each switch on the path 333.

Therefore, after the backup path information is obtained, a backup path table of link failure or switch failure at the time of the deployment is generated. The VLAN transmission port in the switch is removed or the VLAN transmission port in the switch is added according to the backup path table, for example, so as to complete deployment of the backup path 333.

Referring to FIG. 3B, FIG. 3B is a schematic diagram illustrating an error event occurring in the VLAN routing that has been deployed between multiple switches according to one of the exemplary embodiments of the disclosure and an example of switching the routing to the pre-calculated backup path. If the fifth switch 318 fails or is damaged, a problem will occur in the main path 331 of the original VLAN routing. After the controller 340 is notified through the third switch 314, the sixth switch 320 and/or other switches, the controller 340 confirms that the switch 318 fails or is damaged and directly deploys the backup path 335 according to the pre-calculated backup path table 342, in which the backup path 335 passes through the first switch 310, the third switch 314, and the fourth switch 316 to the sixth switch 320. In the deployment process, the VLAN transmission port used by the switch on the original main path 331 is re-deployed, so as to switch to the VLAN transmission port be used by the backup path 335.

Figure 4A:
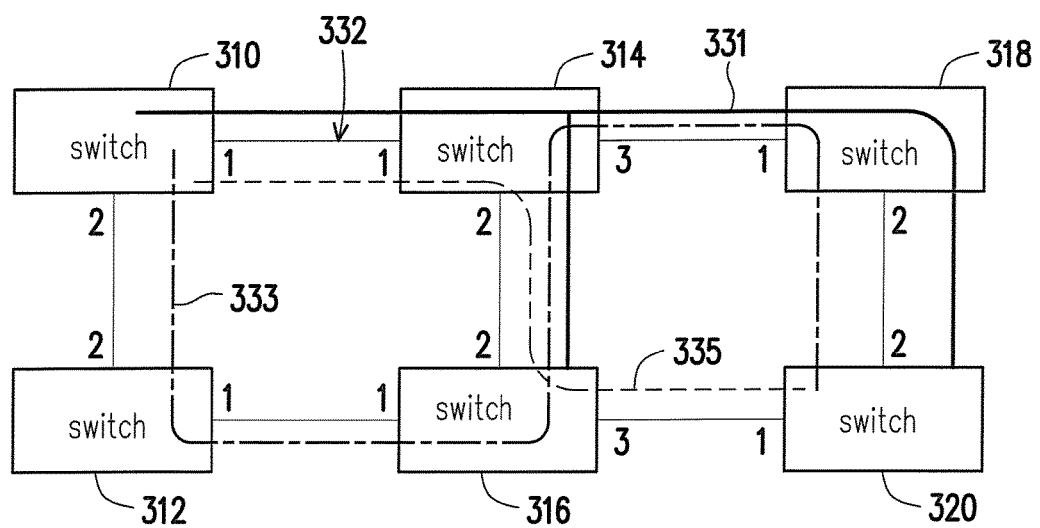
FIG. 4A is a schematic diagram illustrating the VLAN routing configuration that has been deployed between multiple switches under the network of the exemplary embodiment of FIG. 3A to FIG. 3B.

Referring to FIG. 4A to FIG. 4C, FIG. 4A to FIG. 4C are schematic diagrams illustrating that when an error event occurs in the VLAN routing that has been deployed between multiple switches and the routing is switched to the pre-calculated backup path, the switches on the path are switched to the corresponding VLAN transmission port according to one of the exemplary embodiments of the disclosure, in which FIG. 4A is a schematic diagram illustrating the VLAN routing configuration that has been deployed between multiple switches under the network 300 of the exemplary embodiment of FIG. 3A to FIG. 3B; and FIG. 4B and FIG. 4C respectively illustrate the backup paths the controller pre-calculates for failure events of all the links and switches. The same elements are assigned with the same reference numerals in FIG. 4A and FIG. 3A to FIG. 3B. Thus, details thereof are not repeated hereinafter. In the network 300, the routing main path 331 has been deployed in the VLAN Vlan10, which includes a port 1 of the first switch 310, a port 1 and a port 3 of the third switch 314, a port 1 and a port 2 of the fifth switch 318, and a port 2 of the sixth switch 320.

First, referring to FIG. 4A and FIG. 4B, when the link 332 between the first switch 310 and the third switch 314 fails or is damaged, the VLAN Vlan10 becomes unusable, for example. The controller 340 is notified through the first switch 310 and/or the third switch 314 (see FIG. 3B). Then, the controller 340 confirms to deploy the VLAN Vlan10 to the backup path 333, for example, which passes through the first switch 310, the second switch 312, the fourth switch 316, the third switch 314, and the fifth switch 318 to the sixth switch 320. In the deployment process, the switches re-deploy transmission ports for Vlan10. That is, the Vlan10 transmission ports used by the switches on the main path 331 are re-deployed, so as to switch to the VLAN transmission port planned to be used by each switch on the backup path 333.

In an exemplary embodiment, referring to FIG. 4B, according to a pre-calculated link failure event backup path table 410, the content in the backup path 333 corresponding to the link 332 of Vlan10 includes: (1) switching from the port 2 of the first switch 310 to the port 2 of the second switch 312; (2) switching from the port 1 of the second switch 312 to the port 1 of the fourth switch 316; (3) switching from the port 2 of the fourth switch 316 to the port 2 of the third switch 314; (4) switching from the port 3 of the third switch 314 to the port 1 of the fifth switch 318; and (5) switching from the port 2 of the fifth switch 318 to the port 2 of the sixth switch 320.

Next, referring to FIG. 4A and FIG. 4C, if the fifth switch 318 fails or is damaged, a problem occurs in the main path 331 of the original VLAN Vlan10 routing. After the controller 340 is notified through the third switch 314, the sixth switch 320 and/or other switches, for example, the controller 340 confirms that the fifth switch 318 fails or is damaged and directly deploys a backup path 335 according to the pre-calculated backup path table 342, in which the backup path 335 passes through the first switch 310, the third switch 314, and the fourth switch 316 to the sixth switch 320. In the deployment process, the VLAN transmission ports used by the switches on the main path 331 are re-deployed, so as to switch to the Vlan10 transmission ports used by the backup path 335.

In an exemplary embodiment, referring to FIG. 4C, according to the pre-calculated switch failure backup path table 420, the content in the backup path 335 corresponding to the failure event of the fifth switch 318 of the Vlan10 includes: (1) switching from the port 1 of the first switch 310 to the port 1 of the third switch 314; (2) switching from the port 2 of the third switch 314 to the port 2 of the fourth switch 316; and (3) switching from the port 3 of the fourth switch 316 to the port 1 of the sixth switch 320.

According to the exemplary embodiment of the disclosure, the method for VLAN recovery performed between the controller and multiple switches in the hybrid SDN configuration pre-calculates the failure event calculation backup paths for all the links and switches of each VLAN by using the characteristics of SDN centralized management. When a failure event occurs in the links or switches, the controller may deploy the corresponding backup path by receipt of the failure event, based on the link failure event backup path table 410 or the switch failure backup path table 420 of FIG. 4B and FIG. 4C for example, to re-deploy the path, so as to eliminate the convergence time required for repairing the VLAN path, achieve a quick recovery mechanism in the hybrid SDN configuration, and improve the reliability of data transmission.

In the method for VLAN recovery provided by the disclosure, when the routing path is re-deployed due to link failure or switch failure according to the link failure event backup path table 410 or the switch failure backup path table 420, the order of removing or adding the VLAN transmission part should be noted, so as to avoid the risk of loop of the network, for example. Thus, when re-deployment is performed using the link failure event backup path table 410 of FIG. 4B, a link failure event backup path table 510 at the time of deployment (as shown in FIG. 5A), for example, needs to be completed. When re-deployment is performed using the switch failure backup path table 420 of FIG. 4C, a switch failure backup path table at the time of deployment (as shown in FIG. 5B), for example, needs to be completed.

Referring to FIG. 5A, the link failure event backup path table 510 at the time of deployment, when re-deployment is performed using the link failure event backup path table 410 of FIG. 4B, includes: (1) removing Vlan10 from the port 1 of the first switch 310; (2) removing Vlan10 from the port 1 of the third switch 314; (3) adding Vlan10 from the port 2 of the first switch 310; (4) adding Vlan10 from the port 2 of the second switch 312; (5) adding Vlan10 from the port 1 of the second switch 312; and (6) adding Vlan10 from the port 1 of the fourth switch 316.

Referring to FIG. 5B, in this exemplary embodiment, the fifth switch 318 fails or is damaged, and when re-deployment is performed using the switch failure event backup path table 420 of FIG. 4C, the switch failure event backup path table 520 at the time of deployment includes: (1) removing Vlan10 from the port 3 of the third switch 314; (2) removing Vlan10 from the port 2 of the sixth switch 320; (3) adding Vlan10 from the port 3 of the fourth switch 316; and (4) adding Vlan10 from the port 1 of the sixth switch 320.

Figure 6:
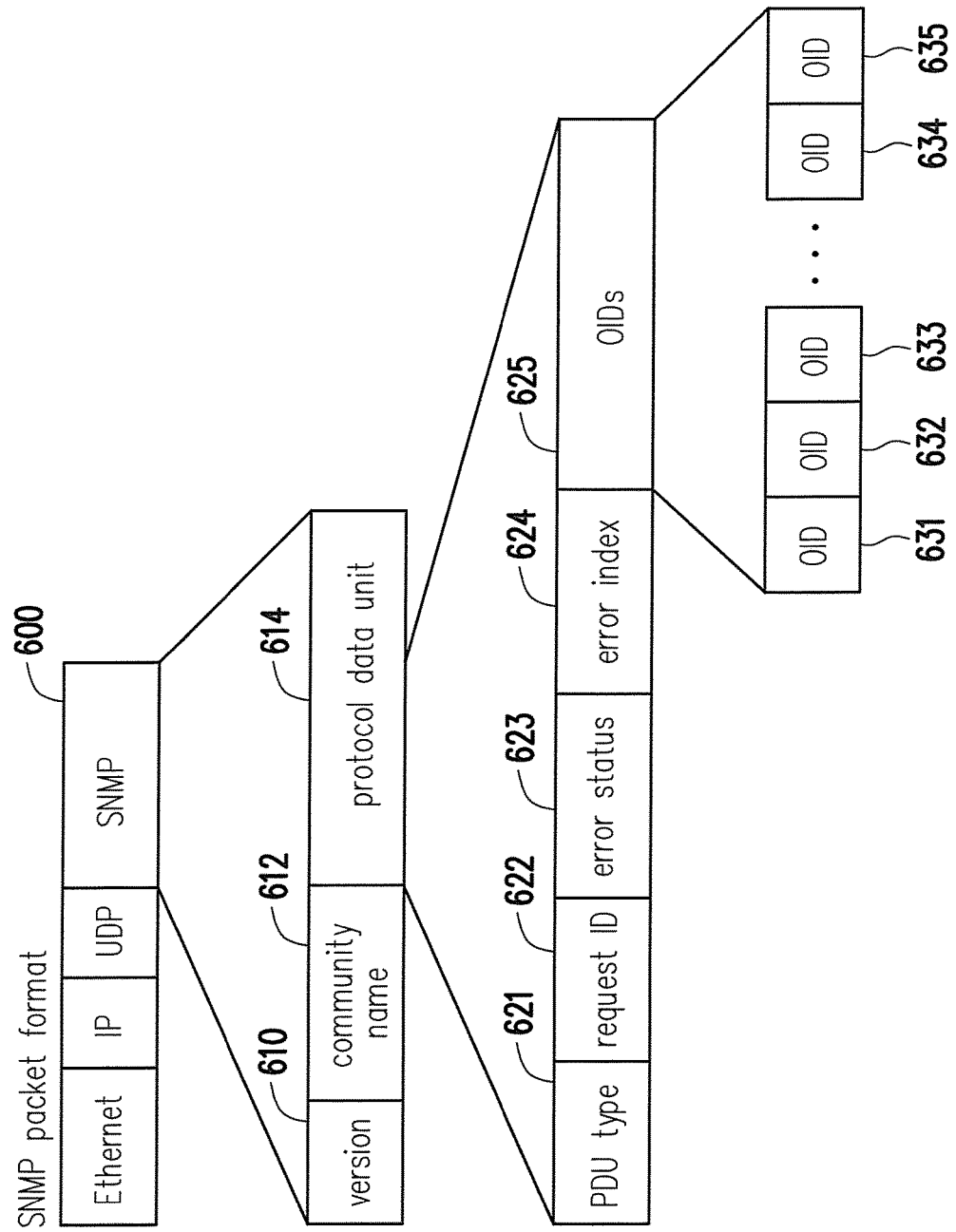
FIG. 6 is a schematic diagram illustrating a packet format used as SNMP according to an exemplary embodiment of the disclosure.

The method for VLAN recovery provided in the exemplary embodiment of the disclosure is suitable for the hybrid SDN configuration. The network constructed under the hybrid SDN configuration may control the Ethernet switches by using SNMP or a CLI instruction, and control the software-definable switches by using an OpenFlow module. A packet format of SNMP is illustrated in FIG. 6. The SNMP packet includes a version 610, a community name 612, and a protocol data unit (PDU) 614, for example. The PDU 614 includes a PDU type 621, a request ID 622, an error status 623, an error index 624, and a plurality of object identifiers (OIDs) 625. The OIDs 625 may include individual object identifiers (OID) 631-635, for example. The manager of SNMP notifies the corresponding switch how to perform the setting according to the individual object identifiers, e.g. the OIDs 631-635 as shown. Different switches have different settings, so as to achieve the deployment process for VLAN recovery of the disclosure.

Figure 7:
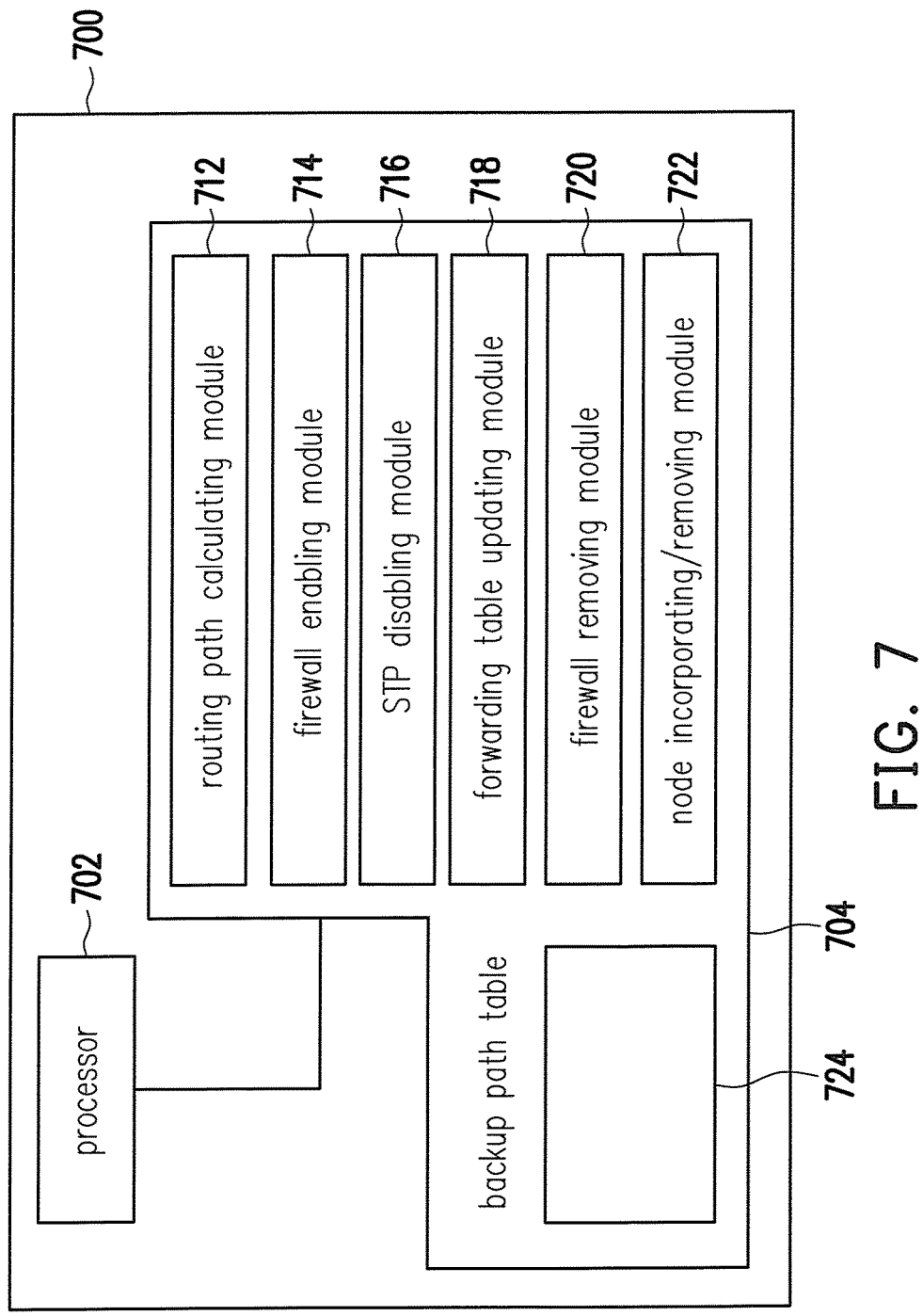
FIG. 7 is a schematic diagram illustrating the controller according to an exemplary embodiment of the disclosure.

FIG. 7 is a schematic diagram illustrating the controller according to an exemplary embodiment of the disclosure. Referring to FIG. 7, a controller 700 includes a processor 702 and a memory 704. The method for VLAN recovery is performed between the controller 700 and multiple switches in the hybrid SDN configuration provided in this exemplary embodiment of the disclosure. The controller 700 pre-calculates a failure event calculation backup path table 724 for all the links and switches of each VLAN and stores the same in the memory 704 based on the characteristics of SDN centralized management. When a failure event occurs in the links or switches, the controller 700 may deploy the corresponding backup path by receipt of the failure event, based on the link failure event backup path table 410 or the switch failure backup path table 420 of FIG. 4B and FIG. 4C for example, to perform re-deployment, so as to eliminate the convergence time required for repairing the VLAN path and improve the reliability of data transmission.

The processor 702 is for controlling the whole operation of the controller 700. The processor 702 is a central processing unit (CPU), for example, but the disclosure is not limited thereto.

The memory 704 is for storing data. The memory 704 is a static random-access memory (SRAM), a dynamic random access memory, a flash memory, other memories, or a combination of the foregoing, for example. Nevertheless, the disclosure is not limited thereto. Particularly, the memory 704 stores a plurality of instructions, and the processor 702 executes the instructions to complete the method for VLAN recovery provided in this disclosure.

Specifically, in an exemplary embodiment, the instructions may include a routing path calculating module 712, a firewall enabling module 714, a STP disabling module 716, a forwarding table updating module 718, a firewall removing module 720, and a node incorporating/removing module 722. Here, the processor 702 executes the routing path calculating module 712 to form network topology and calculate the routing paths based on the nodes in the network; executes the firewall enabling module 714 to enable the firewall of each node so as to block the routing between the nodes; executing the STP disabling module 716 to disable the STP function of each node; executing the forwarding table updating module 718 to populate the forwarding table of each node; executing the firewall removing module 720 to remove the firewall of each node; and executing the node incorporating/removing module 722 to detect addition or removal of nodes.

In addition, the instructions may be stored in a computer-readable recording medium. The computer-readable recording medium is a CD-ROM, a magnetic tape, a floppy disc, or an optical data storage device, for example.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A recovery method of a virtual local area network (VLAN) for a network in a hybrid software-defined network (hybrid SDN) configuration, wherein the network at least comprises a controller and a plurality of switches, the recovery method comprising:
   pre-calculating a backup path table based on the network; and
   generating an event notification message according to a connection failure of the VLAN, and enabling a link failure process according to the backup path table in response to the event notification message and simultaneously performing a checking process, wherein
   if a result of the checking process indicates that the connection failure is a switch failure event, a setting changed by the link failure process is recovered and a switch failure process is performed to re-establish the VLAN according to a first path corresponding to the connection failure of the VLAN in the backup path table; and
   if the result of the checking process indicates that the connection failure is not the switch failure event, the link failure process re-establishes the VLAN according to a second path corresponding to the connection failure of the VLAN in the backup path table.

2. The recovery method of the VLAN according to claim 1, wherein if the result of the checking process indicates that the connection failure is the switch failure event, the link failure process is stopped and the setting changed by the link failure process is not recovered.

3. The recovery method of the VLAN according to claim 1, wherein the pre-calculated backup path table comprises a link failure backup path table and a switch failure backup path table.

4. The recovery method of the VLAN according to claim 1, further comprising re-establishing another backup path table based on the network.

5. The recovery method of the VLAN according to claim 1, further comprising filtering the event notification message to confirm whether the event notification message has been processed after receiving the event notification message and before enabling the link failure process.

6. The recovery method of the VLAN according to claim 1, wherein the switches in the hybrid SDN comprise a plurality of Ethernet switches, wherein the event notification message comprises an abnormal condition notification signal sent by one of the plurality of Ethernet switches.

7. The recovery method of the VLAN according to claim 6, wherein the abnormal condition notification signal sent by one of the plurality of Ethernet switches is an abnormal condition notification signal SNMP Trap of a simple network management protocol (SNMP).

8. The recovery method of the VLAN according to claim 1, wherein the switches in the hybrid SDN comprise a plurality of software-definable switches, wherein the event notification message comprises a link failure notification message sent by the software-definable switch or keep alive information that a controller and the software-definable switches regularly exchange.

9. The recovery method of the VLAN according to claim 1, wherein the checking process comprises sending a detection signal to detect the switches corresponding to the event notification message in the network one by one and confirming whether the result is the switch failure event according to a response condition corresponding to the detection signal.

10. The recovery method of the VLAN according to claim 9, wherein the detection signal is a packet conforming to an Internet control management protocol (ICMP).

11. The recovery method of the VLAN according to claim 9, wherein the detection signal is a packet conforming to one of an OpenFlow protocol, a Telnet communication protocol, a secure shell (SSH) remote login protocol application, the SNMP, and an address resolution protocol (ARP).

12. A controller for performing a recovery function for a VLAN in a network of a hybrid SDN configuration, wherein the controller comprises a processor configured to receive an event notification message and a memory for storing a backup path table, wherein
the processor enables a link failure process according to the backup path table and re-establishes the VLAN according to a first path in the backup path table in response to a connection failure of the VLAN; and
the processor performs a checking process in response to the connection failure of the VLAN, wherein if a result of the checking process indicates that the connection failure is a switch failure event, the processor recovers a setting changed by the link failure process and performs a switch failure process to re-establish the VLAN according to a second path corresponding to the connection failure of the VLAN in the backup path table; and if the result of the checking process indicates that the connection failure is not the switch failure event, the processor stops performing the checking process.

13. The controller according to claim 12, wherein if the result of the checking process indicates that the connection failure is the switch failure event, the link failure process is stopped and the setting changed by the link failure process is not recovered.

14. The controller according to claim 12, wherein the backup path table stored in the memory is generated by pre-calculation performed by the processor based on the network in the hybrid SDN configuration and stored in the memory.

15. The controller according to claim 13, wherein the backup path table comprises a link failure backup path table and a switch failure backup path table to be used when the processor is configured to perform the link failure process and the checking process.

16. The controller according to claim 12, wherein after the processor is configured to perform the link failure process and the checking process, the processor is further configured to establish another backup path table based on the re-established VLAN and update the another backup path table to the memory to replace the backup path table.

17. The controller according to claim 12, wherein the memory is a static random-access memory (SRAM), a dynamic random access memory, a flash memory, other memories, or a combination of the foregoing.

18. The controller according to claim 12, wherein when the processor is configured to perform the link failure process, the event notification message is filtered to confirm whether the event notification message has been processed before the link failure process is enabled.

19. The controller according to claim 12, wherein the event notification message is an abnormal condition notification signal SNMP Trap of a simple network management protocol (SNMP).

20. The controller according to claim 12, wherein the event notification message is keep alive information that the processor is configured to regularly exchange with the network.

21. The controller according to claim 12, wherein the processor is configured to perform the checking process, which comprises sending a detection signal to detect the switches corresponding to the event notification message in the network one by one and confirming whether the result is the switch failure event according to a response condition corresponding to the detection signal.

22. The controller according to claim 12, wherein the detection signal is a packet conforming to one of an OpenFlow protocol, a Telnet communication protocol, a secure shell (SSH) remote login protocol application, the SNMP, and an address resolution protocol (ARP).

23. A system with a recovery function for a VLAN for a network in a hybrid SDN configuration, wherein the system at least comprises a controller and a plurality of switches, wherein:
the switch generates an event notification message according to a connection failure of the VLAN; and
the controller simultaneously performs a link failure process and a checking process when receiving the event notification message, wherein:
the controller performs the link failure process, which comprises re-establishing the VLAN on the switches on the corresponding path according to a first path corresponding to the connection failure of the VLAN in a backup path table; and
when the controller performs the checking process, if a result of the checking process indicates that the connection failure is a switch failure event, a setting changed by the link failure process is recovered and a switch failure process is performed to re-establish the VLAN on the switches on the corresponding path according to a second path corresponding to the connection failure of the VLAN in the backup path table, and if the result of the checking process indicates that the connection failure is not the switch failure event, the checking process is stopped.

24. The system with the recovery function for the VLAN according to claim 23, wherein if the result of the checking process indicates that the connection failure is the switch failure event, the link failure process is stopped and the setting changed by the link failure process is not recovered.

25. The system with the recovery function for the VLAN according to claim 23, wherein the backup path table is generated by pre-calculation performed by the controller based on the network in the hybrid SDN configuration and stored.

26. The system with the recovery function for the VLAN according to claim 25, wherein the backup path table comprises a link failure backup path table and a switch failure backup path table to be used when the controller performs the link failure process and the checking process.

27. The system with the recovery function for the VLAN according to claim 23, wherein after the controller performs the link failure process and the checking process, the controller further establishes another backup path table based on the re-established VLAN to replace the backup path table.

28. The system with the recovery function for the VLAN according to claim 23, wherein when the controller performs the link failure process, the controller further filters the event notification message to confirm whether the event notification message has been processed before enabling the link failure process.

29. The system with the recovery function for the VLAN according to claim 23, wherein the event notification message is an abnormal condition notification signal SNMP Trap of a simple network management protocol (SNMP).

30. The system with the recovery function for the VLAN according to claim 21, wherein the event notification message is keep alive information that the controller regularly exchanges with the switches of the network.

31. The system with the recovery function for the VLAN according to claim 23, wherein the controller performs the checking process, which comprises sending a detection signal to detect the switches corresponding to the event notification message in the network one by one and confirming whether the result is the switch failure event according to a response condition corresponding to the detection signal.

32. The system with the recovery function for the VLAN according to claim 23, wherein the detection signal is a packet conforming to one of an Internet control management protocol (ICMP), an OpenFlow protocol, a Telnet communication protocol, a secure shell (SSH) remote login protocol application, the SNMP, and an address resolution protocol (ARP).

* * * * *